United States Patent [19]

Davis

[11] Patent Number: 5,588,886
[45] Date of Patent: *Dec. 31, 1996

[54] AIR ENCIRCLING MARINE PROPULSION APPARATUS

[76] Inventor: Grover W. Davis, 3024 Kings Harbor Rd., Panama City, Fla. 32405

[*] Notice: The term of this patent shall not extend beyond the expiration date of Pat. No. 5,482,482.

[21] Appl. No.: 583,661

[22] Filed: Jan. 5, 1996

Related U.S. Application Data

[63] Continuation of Ser. No. 262,884, Jun. 21, 1994, Pat. No. 5,482,482.

[51] Int. Cl.$^6$ .................................................. B63H 1/16
[52] U.S. Cl. ........................... 440/67; 440/66; 416/189
[58] Field of Search ........................... 114/67 A; 440/66, 440/67; 416/90 A, 189 R, 189 B

[56] References Cited

U.S. PATENT DOCUMENTS

| | | | |
|---|---|---|---|
| 4,304,558 | 12/1981 | Holtermann | 440/67 |
| 4,370,096 | 1/1983 | Church. | |
| 5,482,482 | 1/1996 | Davis | 440/67 |

FOREIGN PATENT DOCUMENTS

| | | |
|---|---|---|
| 748218 | 10/1944 | Germany. |
| 629382 | 12/1961 | Italy. |

OTHER PUBLICATIONS

Act, Inc., Marine Propulsion Division, Orlando Fl., Pump Jet Technology For Outboard Motors, 5 pages.

*Primary Examiner*—Jesus D. Sotelo
*Attorney, Agent, or Firm*—Burns, Doane, Swecker & Mathis, L.L.P.

[57] ABSTRACT

An air encircled marine thruster apparatus for a bow or stern thruster includes an outer pipe or duct that surrounds a first pipe carrying a propulsive stream of water to provide an annular blanket of air around the stream. An inner surface of the first pipe is shaped to radially converge at an outlet of the first pipe to form a nozzle. The outer pipe is larger then the first pipe to provide an annular space around the first pipe and propulsive stream exiting the first pipe. A duct leads air into the annular space to form a blanket of air around the propulsive stream, which increases the thrust produced by the propulsive stream.

6 Claims, 7 Drawing Sheets

AIR ENCIRCLING MARINE PROPULSION APPARATUS

This is a continuation of application Ser. No. 262,884, filed Jun. 21, 1994, now U.S. Pat. No. 5,482,482.

FIELD OF THE INVENTION

The present invention relates to an apparatus for improving the thrust produced by marine propulsion devices.

BACKGROUND AND SUMMARY OF THE INVENTION

Marine propulsion systems generally operate to move a vessel in water by producing an accelerated column of water acting against the vessel. The column of water, known as the slipstream, provides a thrust against the propeller, nozzle or other propulsive device to push the vessel through the water.

The present invention, generally, provides an apparatus for increasing the thrust of a marine propulsion system without increasing the load on the engine.

More particularly, the present invention provides an apparatus for increasing the thrust of a conventional marine propulsion system by providing a blanket or layer of air surrounding a slipstream produced by a propulsion system.

According to a first embodiment, the invention provides a device for a propeller. The propeller apparatus comprises a cowling for a conventional marine propeller that radially encloses a propeller and extends downstream of the propeller to encircle the slipstream of the propeller. An inner part of the cowling is shaped as a section of a cone, with the propeller disposed in a front end of the cone section, and the cone section axially converging (or narrowing) in the rearward direction. An outer pan of the cowling is tubular shaped and is longer than the inner part. A front end of the outer part is joined with a front end of the inner part so that the inner and outer parts form a rearward opening annular chamber. Means for providing air to the annular chamber is included to form a blanket of air around the propeller slipstream.

The means for providing air comprises at least a conduit leading engine exhaust to the annular chamber. Additional means includes a duct to lead ambient air to the annular chamber. Movement of the slipstream causes a vacuum in the annular chamber that draws air through the ambient air duct. Other suitable means may also be provided.

A second embodiment relates to bow and stern thrusters for producing lateral movement of a vessel, for example, for maneuvering the vessel during docking. According to the invention, a bow or stern thruster apparatus includes a first pipe connected to a thrust producing device and directed toward a hull of the vessel. A second pipe, having an inner diameter greater than an outer diameter of the first pipe is connected to the hull to form an outlet. The first pipe is disposed in the second pipe so that a space surrounds the first pipe.

The second pipe is connected to a duct for carrying outside air to the space around the first pipe. An outlet of the first pipe is spaced from the outlet of the second pipe and the hull, which provides an exhaust duct for the water stream exiting the first pipe. The exhaust duct provides the part of the apparatus where a blanket of air forms around the stream of water exiting the outlet of the first pipe. Air will typically be aspirated into and through the air duct by the movement of the water stream. Alternatively, air may be forced through the duct by suitable means.

BRIEF DESCRIPTION OF THE DRAWING FIGURES

The present invention can be further understood with reference to the following description in conjunction with the appended drawings, wherein like elements are provided with the same reference numerals. In the drawings.

DETAILED DESCRIPTION OF PREFERRED EMBODIMENTS

The invention is described below in connection with embodiments for a marine outboard propeller and for a bow or stern thruster device. In principle, the invention will work with any system that produces a column or stream of water producing thrust, for example, an inboard motor or water jet device.

Figure 1:
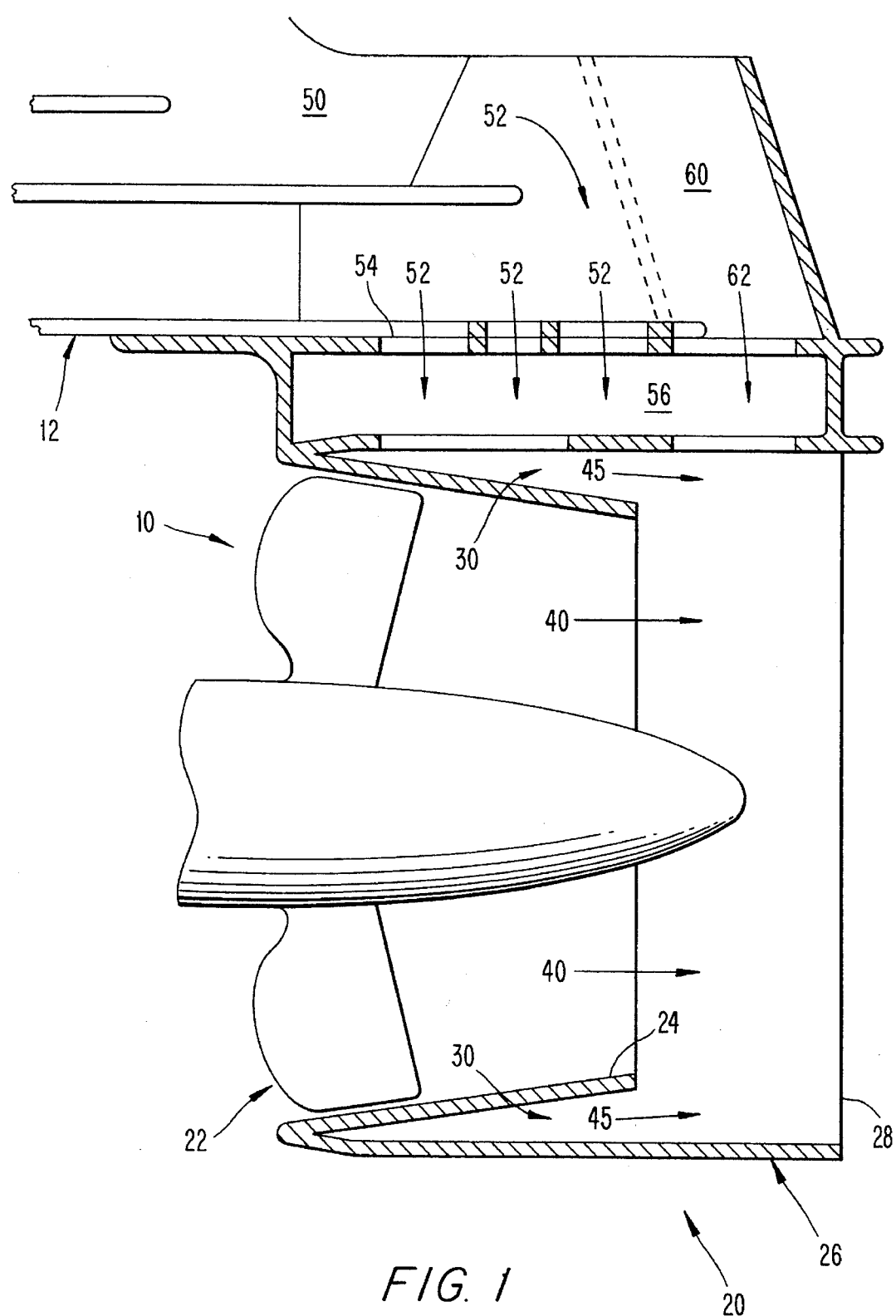
FIG. 1 is a sectional view of an air-encircling thruster cowling for a propeller according to the present invention.
Figure 2:
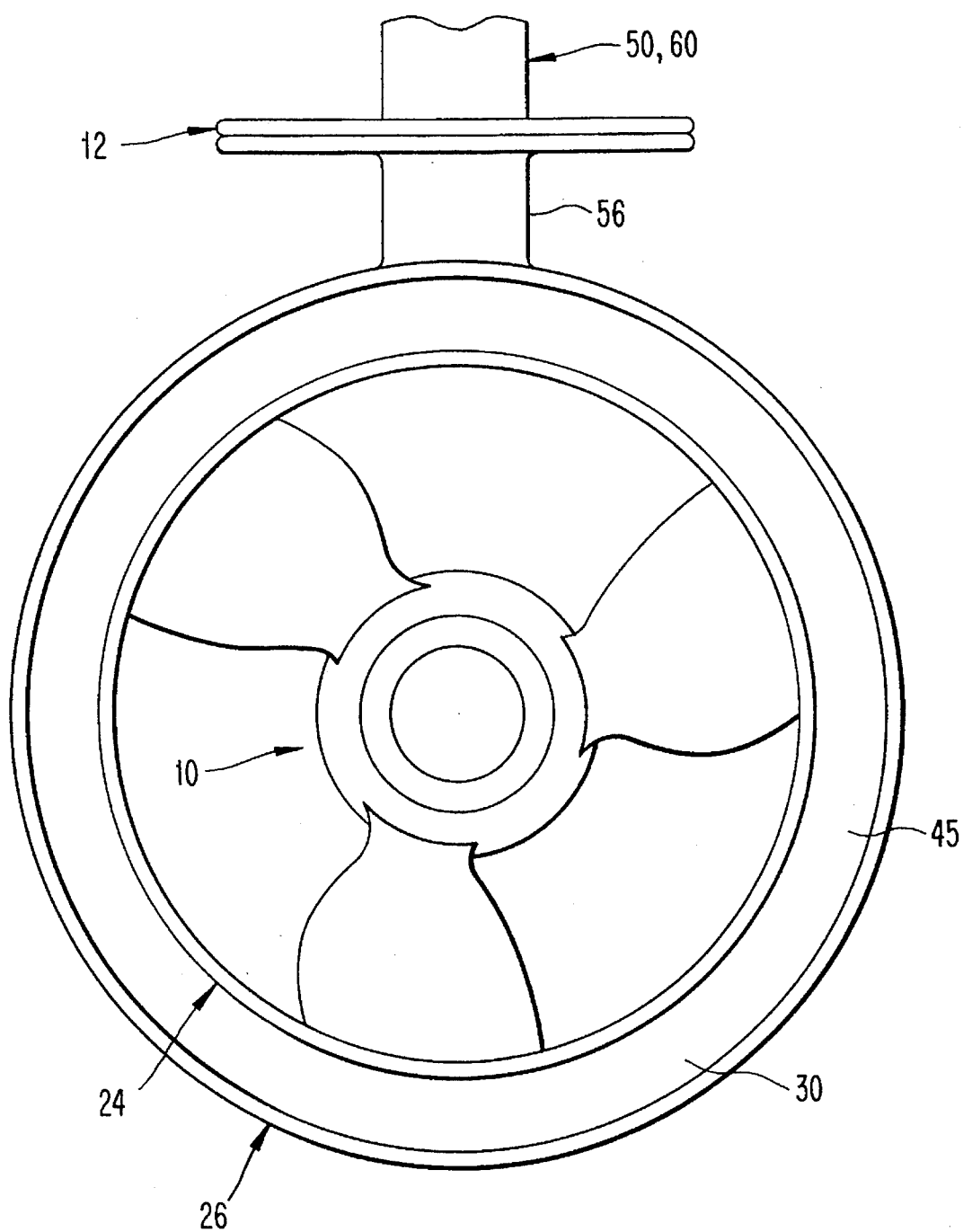
FIG. 2 is a rear view of the thruster cowling of FIG. 1.

FIG. 1 is a sectional view of an air encircling marine propeller apparatus, or thruster cowling 20, for a propeller 10. FIG. 2 is rear view of the propeller 10 and cowling 20 of the present invention. Only as much of the outboard motor apparatus as is necessary to describe the invention is illustrated. The direction of flow of water and air are indicated by arrows.

The outboard motor includes a propeller 10 supported in a manner as is known. The propeller gearbox and rudder are not illustrated. The cowling 20 is a generally cylindrical body having an inlet end 22 and an outlet end 28. The cowling 20 is mounted to a suitable support structure 12 of the outboard motor adjacent to the propeller 10, so that the propeller is positioned in the cowling 20 adjacent to the inlet end 22.

The cowling 20 comprises two coaxially arranged, hollow elements, an inner body 24 and an outer body 26. The inner body 24 surrounds the propeller 10 and has a predetermined length extending downstream of the propeller. The inner body 24 is formed as a section of a cone, or frustoconical, shape that narrows in the downstream direction. A slipstream produced by the propeller, indicated by arrows 40, moves downstream of the propeller within the inner body 24.

The outer body 26 is formed with a cylindrical shape, and the inner body 24 is disposed within the outer body. The outer body 26 is longer than the inner body 24 extending in the downstream direction a predetermined distance farther than the downstream length of the inner body.

The inner 24 and outer 26 bodies are joined at a common front end 28 to form an annular space 30 the encircles the inner body 24. Means for providing air in the annular space 30 is arranged so that a blanket or layer of air, indicated by arrows 45, flows from the annular space 30 and encircles the slipstream 40 of the propeller 10.

Means for providing air in the annular space 30 includes a conduit 50 that carries exhaust from the outboard motor engine (not illustrated) to the annular space 30. The exhaust, indicated by arrows 52, passes from the conduit 50 to a chamber 56 through a series of openings 54. The chamber 56 communicates with the cowling 20, and the exhaust air 52 then travels to the annular chamber 30. An additional duct 60 is provided to lead ambient air into the chamber 56. Movement of the slipstream past the annular space 30 results in low pressure in the annular space, and consequently, the chamber 56. Air drawn by the duct 60 passes through the chamber 56 to the annular space 30, as indicated by the arrows 62.

The annular stream of air 45 surrounds the slipstream 40 of the propeller 10 as the slipstream exits the inner body 24 of the cowling 20. The encircling air is believed to facilitate the movement of the slipstream 40 into the surrounding water, separating the fast and slow moving water and increasing the thrust generated by the slipstream.

A series of tests on the apparatus of FIGS. 1–2 has indicated that the present invention can significantly increase the thrust produced by a conventional outboard motor propeller at the same engine speed. The tests were performed for both static thrust and speed through the water for a 15 foot bass boat equipped with a 70 horsepower outboard motor.

In static thrust test, the boat was attached to a set of hydraulic scales mounted on a fixed support to measure the thrust produced by the propeller. The engine was run through a range of speeds and the resulting thrust recorded. The test was repeated with the propeller equipped with a cowling according to the present invention. The tests were again repeated with the air injection means blocked to test the effect of the cowling alone.

Figure 3:
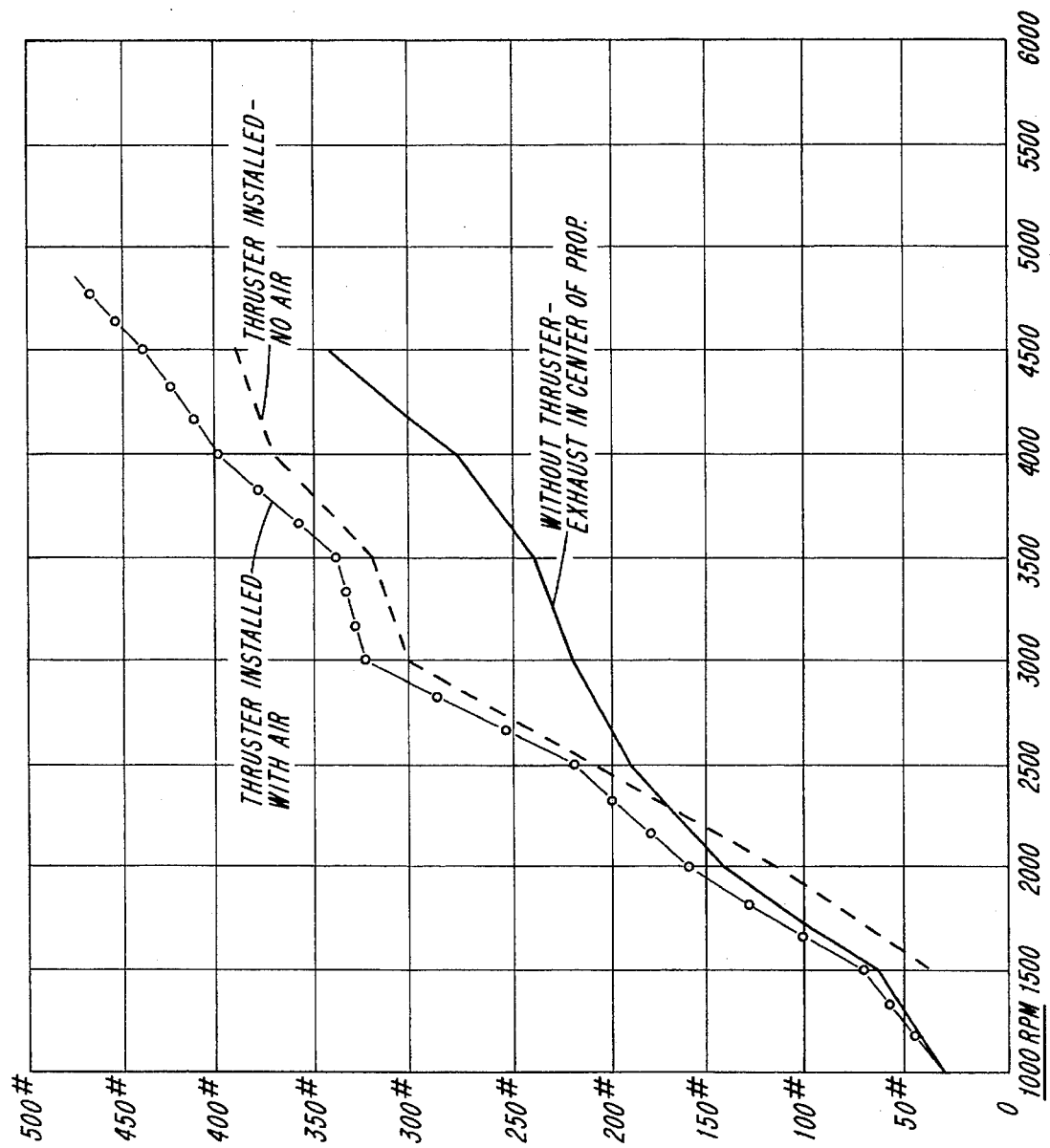
FIG. 3 is a graph of static thrust tests comparing a thrust produced by an engine having a conventional propeller and the same propeller equipped with an air-encircling thruster cowling according to the present invention.

The results of the static tests are shown in FIG. 3. As can be seen, the propeller with a thruster cowling produced thrust significantly higher than a conventional propeller throughout the range of speeds tested, and was greatest in the upper engine speed region. The use of a cowling without an annular air stream around the slipstream increased thrust, but as can be seen, the increase was less than for the cowling with air injection according to the present invention.

Figure 4:
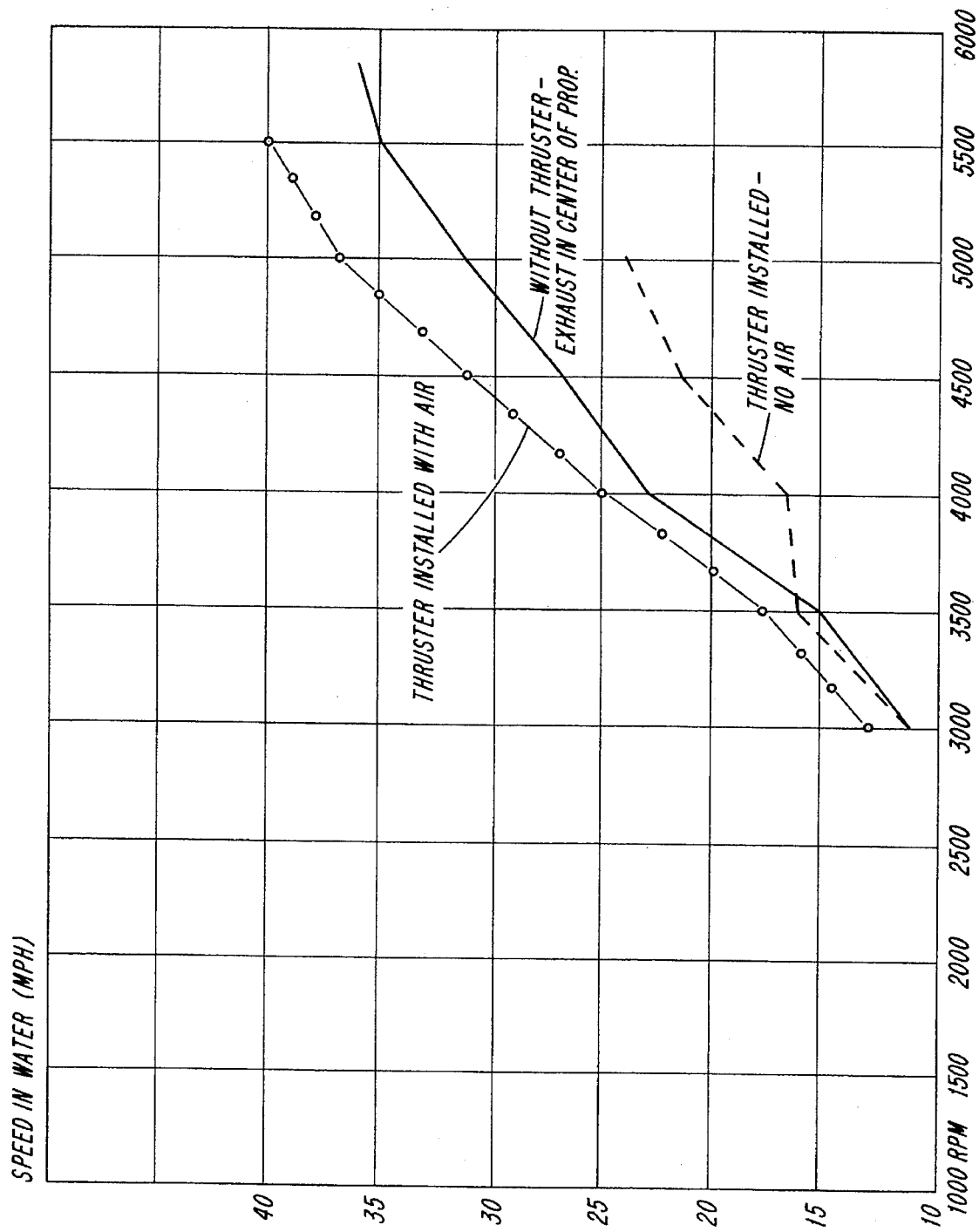
FIG. 4 is a graph of dynamic thrust tests comparing the speed of a boat with an outboard motor having with a conventional propeller and the same propeller equipped with the air-encircling cowling.

For dynamic tests, the speed of the boat at various engine speeds was measured. The engine was taken through a range of engine speeds and the speed of the boat in the water was measured. The tests were conducted with the conventional propeller and with the propeller equipped with the thruster cowling both with and without an air stream. The results of the dynamic tests are shown in FIG. 4. As can be seen, the thruster cowling-equipped propeller produced greater boat speeds throughout the range of engine speeds.

Figure 5:
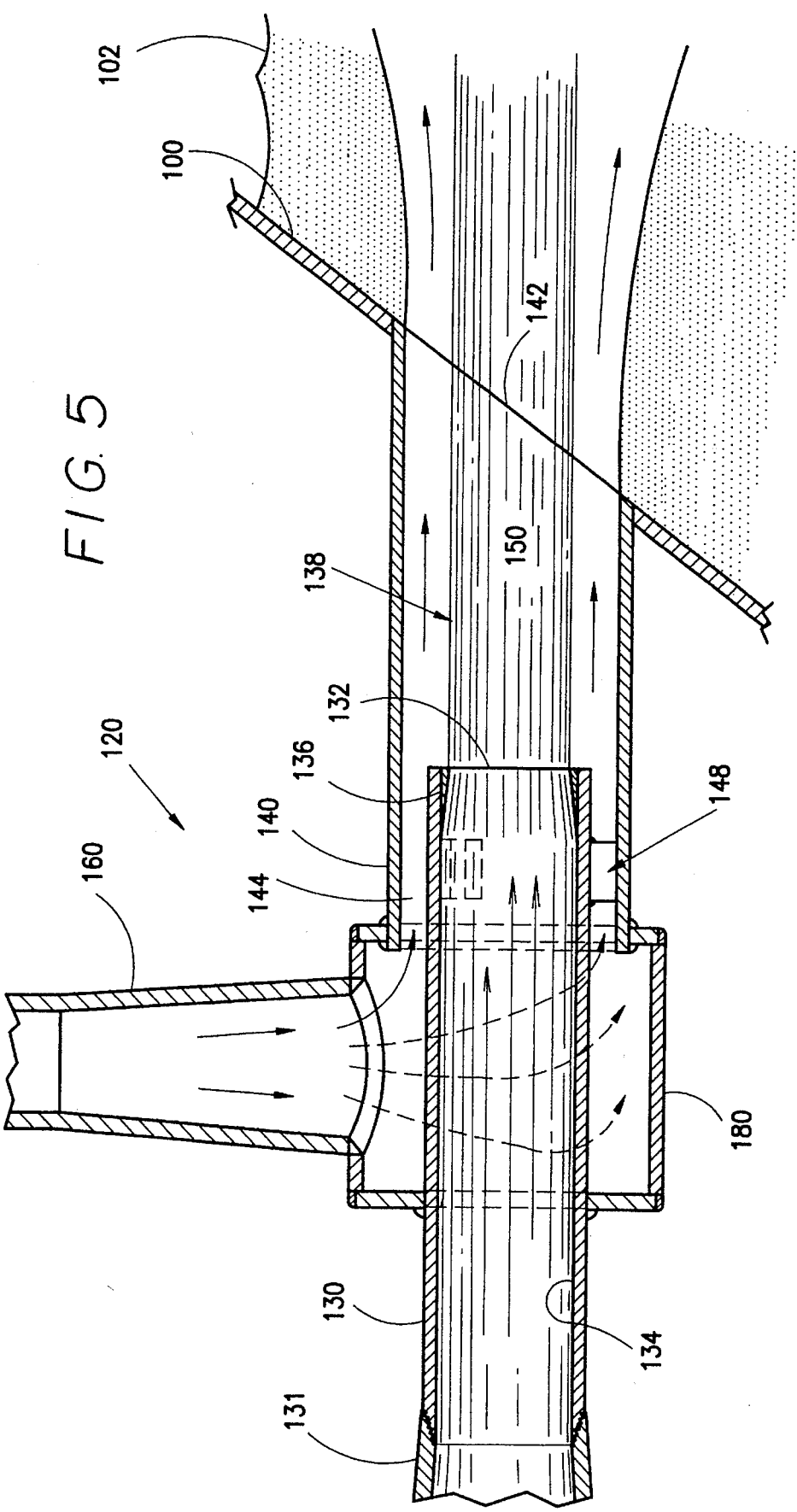
FIG. 5 is a sectional view of an air-encircling apparatus for a bow thruster.
Figure 6:
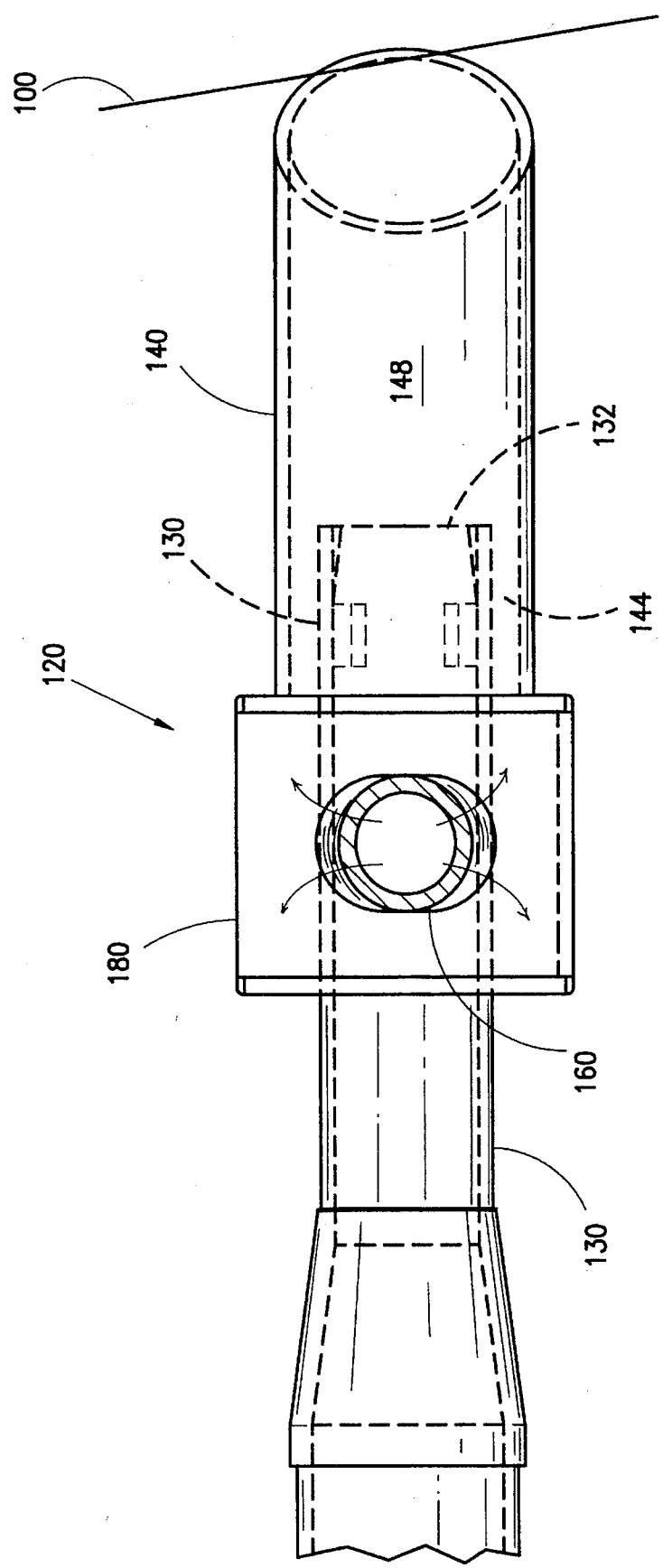
FIG. 6 is a top view of the apparatus of FIG. 5.
Figure 7:
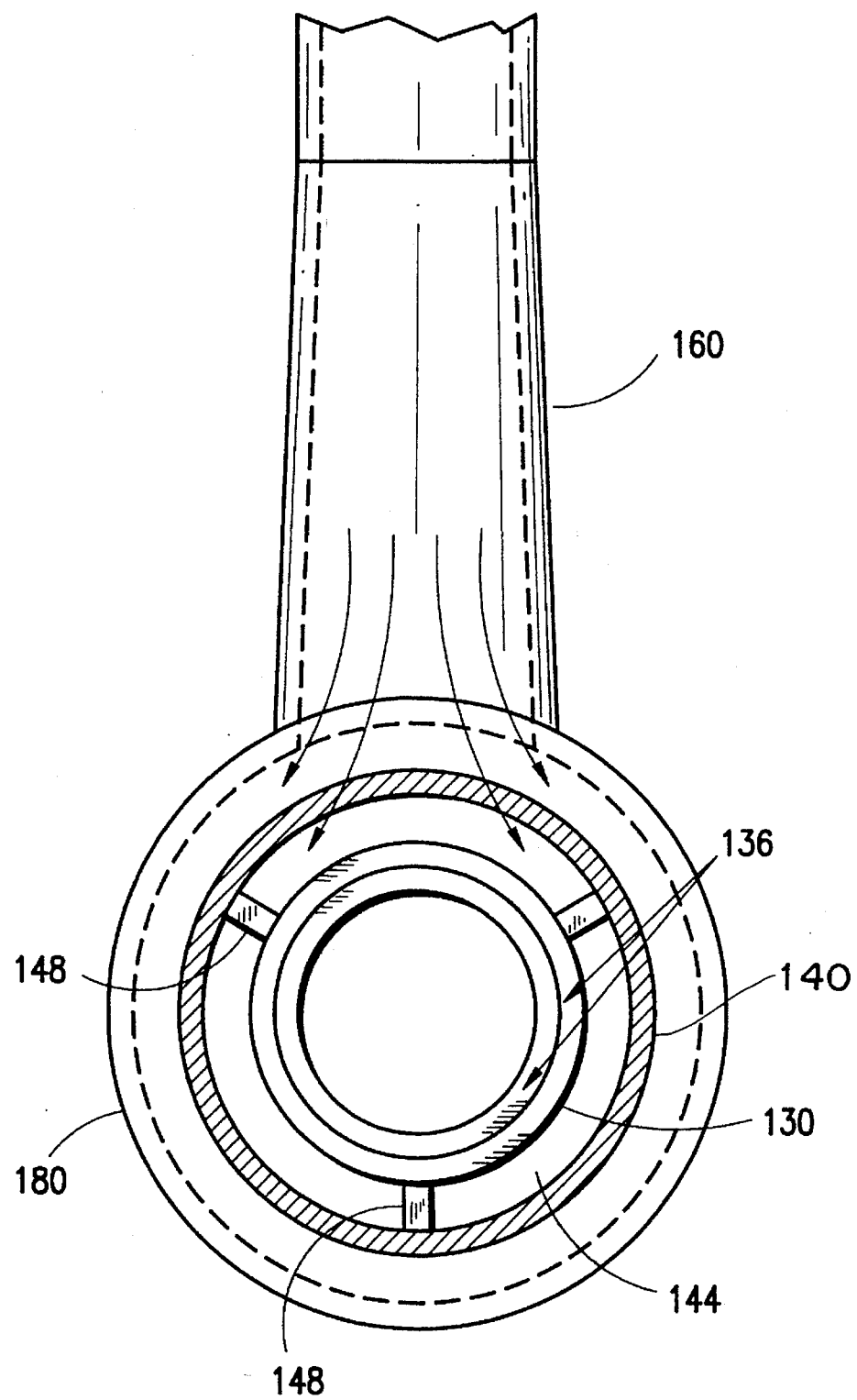
FIG. 7 is an end view of the apparatus of FIG. 5.

FIG. 5 is a sectional view of an apparatus 120 according to the invention for a vessel bow thruster. A hull 100 of the vessel is illustrated in relation to the waterline 102. FIG. 6 is a top view and FIG. 7 is an end view, with the hull 100 removed for clarity, of the apparatus of FIG. 5. In the following description, reference is made simultaneously to all three figures.

The apparatus 120 includes a first pipe 130 for guiding a stream of water produced by a pump or other water jet producing device (not illustrated). As seen in FIG. 5, the first pipe 130 may include a reducer 131 to narrow the diameter and increase the velocity of the water stream. The arrows in the first pipe indicate the flow of a water stream 138 through the first pipe. The first pipe 130 ends in an outlet 132. An inner surface of the first pipe 130 provides a guide surface 134 for the water stream, and a portion of the guide surface 134 at the outlet 132 is shaped to converge radially at the outlet of the second pipe. The converging surface portion 136 forms a nozzle for the exiting water. As illustrated in FIG. 5, the converging surface 136 or nozzle may comprise a frustoconical ring section welded to the inner surface of the first pipe 130 at the outlet 132. Other suitable nozzle devices or fittings may also be used.

A second pipe 140 is mounted with an outlet 142 at the hull 100. The first pipe 130 is mounted in the second pipe 140 and spaced from the interior surface of the second pipe by centering lugs 148. The second pipe 140 has an inner diameter greater than an outer diameter of the first pipe 130 to provide a space 144 that surrounds the first pipe.

An air duct 160 directs outside air, indicated by the arrows in the air duct, to the interior of the second pipe 140. Air is aspirated into the second pipe by movement of the propulsive stream 138 through the second pipe. The space 144 surrounding the first pipe 130 is therefore filled with air to form the blanket of air described in connection with the apparatus of FIGS. 1 and 2. The air duct 160 is joined to the second pipe 140 by a junction chamber 180. In the illustrated embodiment, the junction chamber 180 is a cylindrically shaped, hollow element having an inner diameter greater than an outer diameter of the second pipe 140.

As may be seen in FIG. 5, the outlet 132 of the first pipe 130 does not extend to the outlet 142 of the second pipe, which provides an exhaust duct 150 extending from the outlet 132 of the first pipe to the hull 100. Air introduced by the space 144 around the first pipe 130 surrounds the propulsive stream 136 in the exhaust duct 150 to form a blanket of air for increasing the thrust produced by the propulsive stream 136 as described above.

The bow thruster apparatus according to the invention may be easily adapted to an existing vessel, as may be understood by reference to the drawing figures, by shortening an existing thruster to serve as the described first pipe, and mounting the second pipe and air duct.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following lairs.

What is claimed is:

1. An apparatus for increasing thrust in marine propulsion, comprising:

a first hollow body having a guiding surface to guide a propulsive stream of water and having an outlet, a portion of the guiding surface radially converging toward the outlet;

a second hollow body disposed to surround at least a portion of the first body including the outlet to form a space surrounding first body, the second hollow body extending in the flow direction beyond the outlet; and, duct means for guiding air into the space surrounding the first body to form a blanket of air surrounding the outlet of the first body.

2. The apparatus as claimed in claim 1, wherein said duct means is connected to lead ambient air to the annular space.

3. The apparatus as claimed in claim 1, wherein the first body is connected to means for producing a moving column of water.

4. The apparatus as claimed in claim 1, further comprising a propeller disposed for rotation in a front portion of the first body to produce a column of water that moves through the first body.

5. The apparatus as claimed in claim 1, wherein the first body comprises a first pipe, an inner surface of the pipe comprising the guiding surface, the inner surface being frustoconically shaped to narrow toward the outlet.

6. The apparatus as claimed in claim 5, wherein the second body comprises a second pipe having inner diameter greater than an outer diameter of the first pipe.

* * * * *

UNITED STATES PATENT AND TRADEMARK OFFICE
Certificate

Patent No. 5,588,886. Patented: December 31, 1996

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Grover W. Davis and Edsel G. Davis.

Signed and Sealed this Eleventh Day of April, 2000.

S. JOSEPH MORANO
*Supervisory Patent Examiner*
Art Unit 3617